UNITED STATES PATENT OFFICE.

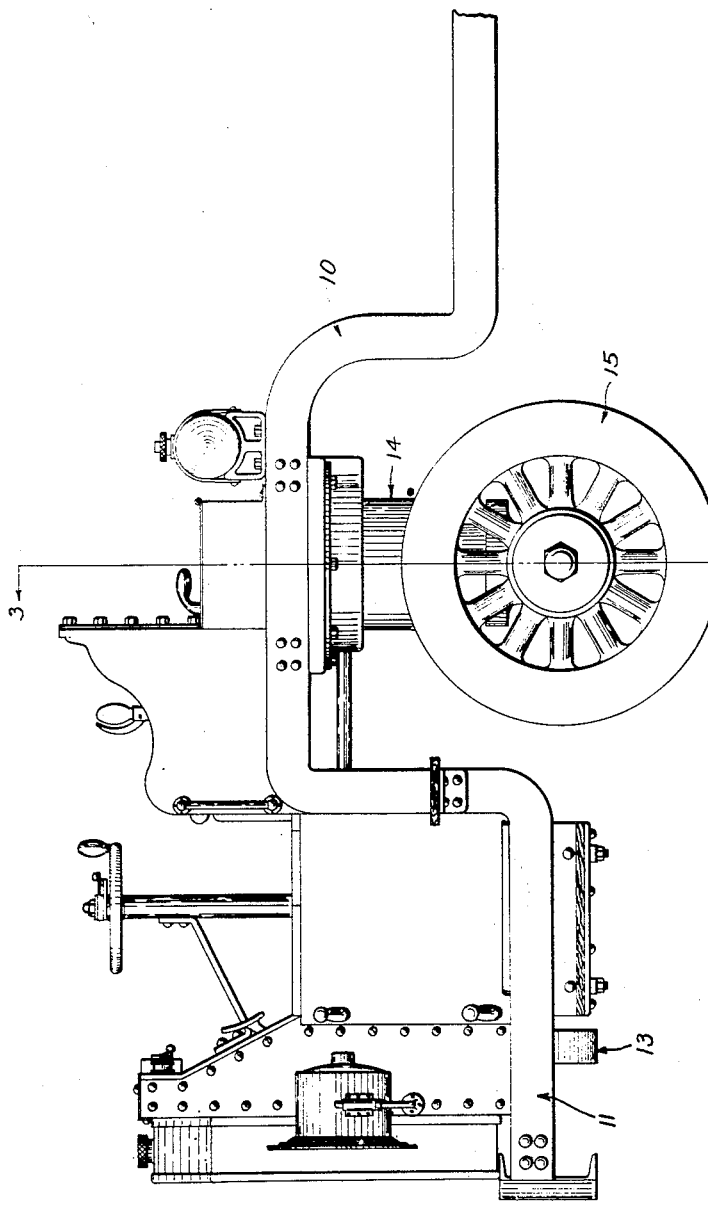

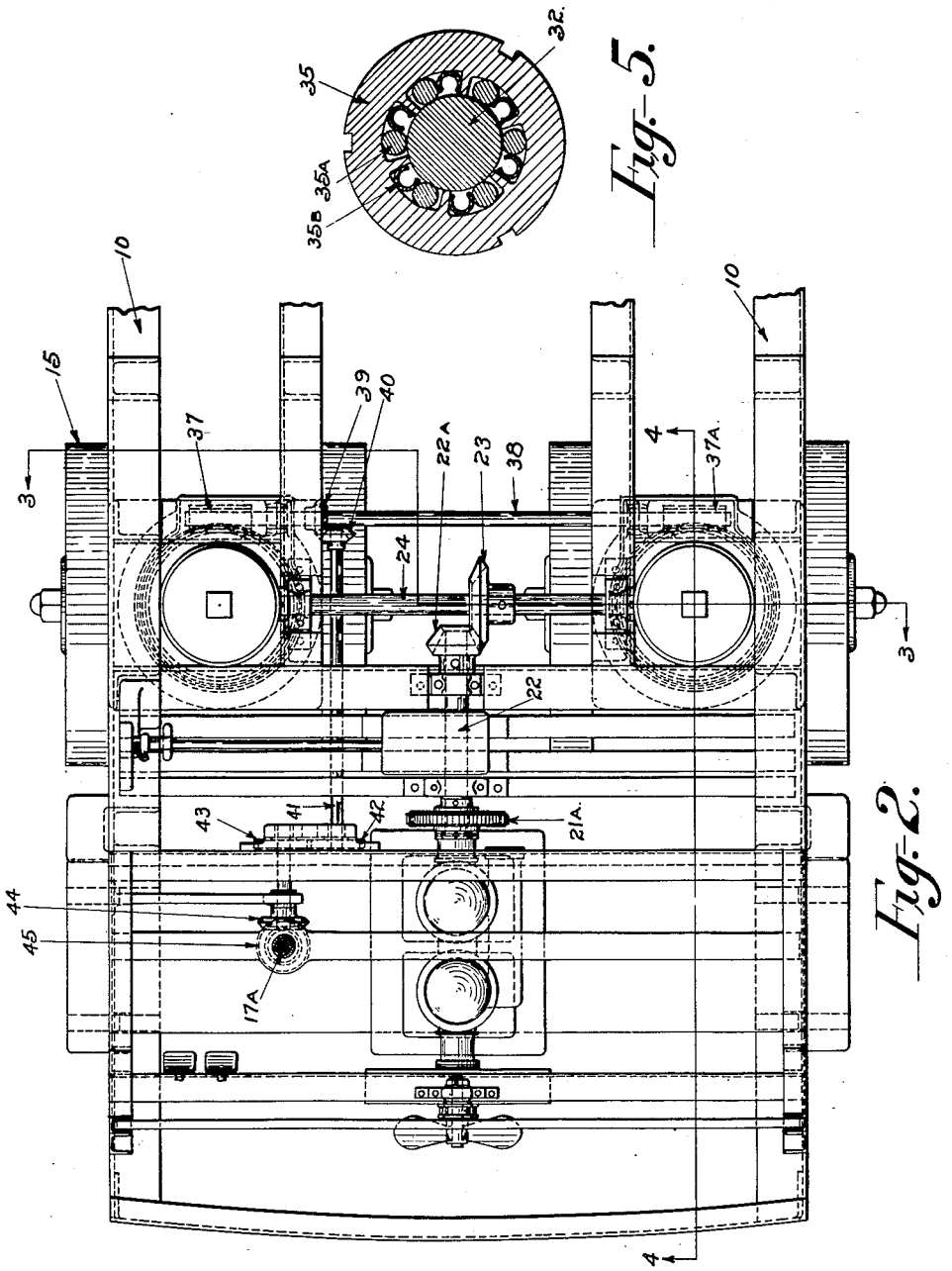

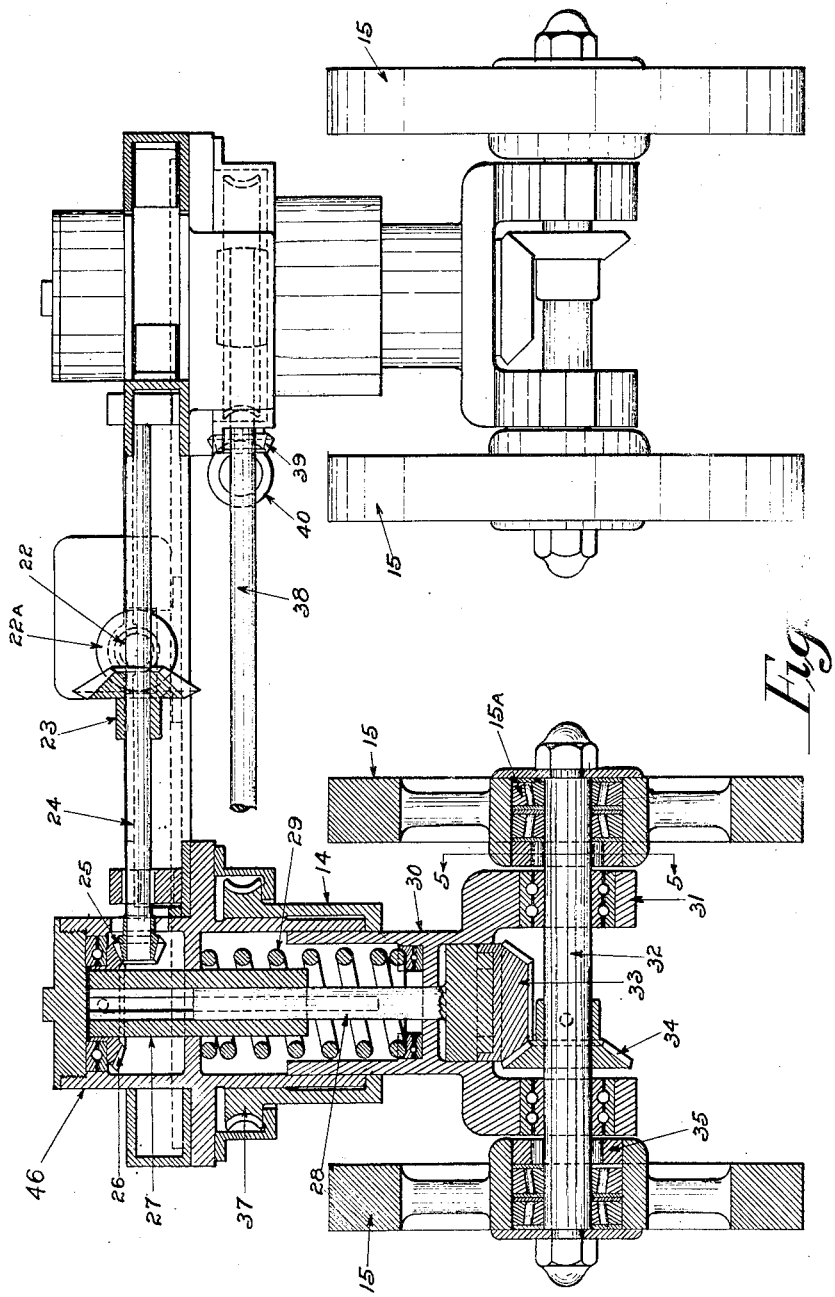

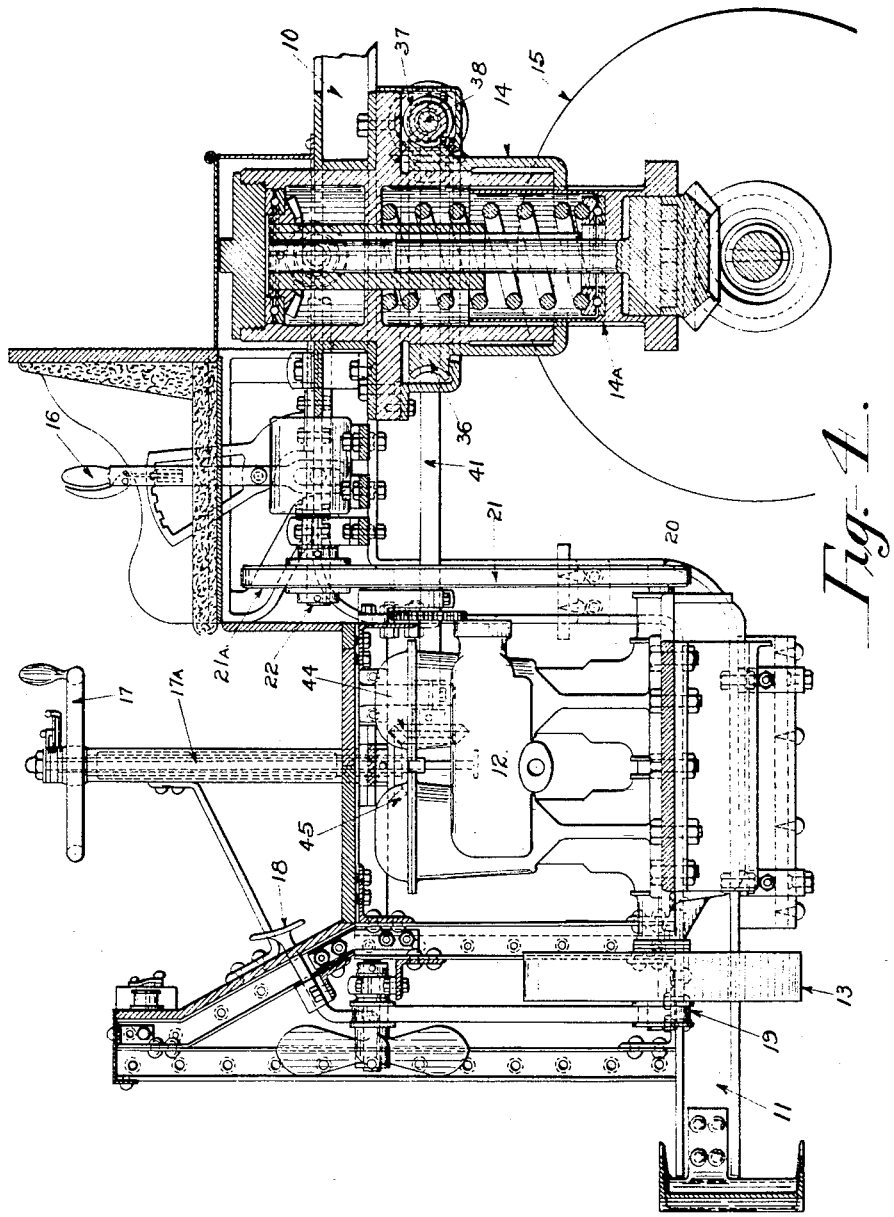

OTIS A. HOLLIS, OF PITTSBURGH, PENNSYLVANIA, ASSIGNOR, BY MESNE ASSIGNMENTS, TO HOLLIS AUTOMATIC TRACTION JACK COMPANY, OF PITTSBURGH, PENNSYLVANIA, A CORPORATION OF DELAWARE.

AUTOMOBILE VEHICLE.

1,189,256.  Specification of Letters Patent.  Patented July 4, 1916.

Application filed June 3, 1912. Serial No. 701,265.

*To all whom it may concern:*

Be it known that I, OTIS A. HOLLIS, a citizen of the United States, residing at Pittsburgh, in the State of Pennsylvania, have invented certain new and useful Improvements in Automobile Vehicles, of which the following is a specification.

My invention relates particularly to means for driving self propelled vehicles and is here illustrated as a motor truck for heavy draft, but is as well applicable to any other form of vehicle.

The primary object of the invention is to improve the driving gear, and render more efficient the application of power, to facilitate the turning of the vehicle without loss of power and in general to improve the construction and operation of motor driven vehicles.

In the accompanying drawing I have illustrated a form of the invention.

Figure 1 is a side elevation of the front part of a freight truck equipped with my invention. Fig. 2 is a plan view of the same; Fig. 3 is a cross-section on the line (3), (3), in Fig. 2, and Fig. 4 is a longitudinal vertical section along the line (4), (4), in Fig. 2. Fig. 5 is a vertical section in detail on the line (5) in Fig. 3 showing an automatic clutch for the driving wheels.

There have been recognized heretofore certain advantages in driving such vehicles by the forward wheels rather than the rear wheels, but so far as I am aware there has been no vehicle so constructed as to drive by the front wheels and yet allow a full application of power in turning, or a complete radius of turning:—in other words, there has been no universal drive applied to front wheels. In my design as indicated in Fig. 1, I prefer to place the engine and its accessories on a forwardly projecting part on the frame 10, so as to bring the weight of the motor and a large portion of the weight of the vehicle itself and its load upon the front wheels 15, thereby more effectually utilizing the dead weight and also enabling me to lower the center of gravity without lessening the loading platform between the wheels. In this figure, I represent at 12 an engine of any preferred form, which through proper gearing located on the housing 14, in this form drives four wheels 15, arranged in independent pairs, but having synchronous movement and all applying equal power. It will be seen that by this arrangement the thrust of the wheels on the roadway, while directly applied for steering, is yet balanced; a broad but divided tread is secured for soft and muddy ground while on rutty or bumpy roads the vehicle rides easier by equalizing the effects of obstacles. It also increases the tractive force, owing to a firmer and better grasp upon the roadbed.

Referring now especially to Figs. 3 and 4; the engine shaft carrying the flywheel 13 and a sprocket 20, is preferably connected by chain 21 and sprocket wheel 21$^a$, to a centrally located horizontal shaft 22, which by means of bevel gears 22$^a$ and 23, drives the horizontal cross shaft 24, driving the vehicle wheels on its two ends.

In Fig. 3, it will be seen that the end of shaft 24 is provided with a bevel gear 25, engaging a bevel gear 26 mounted in a column 46, and fixed to the vertical sleeve 27. Inside this sleeve is splined a shaft 28, carrying at the bottom a bevel gear 33 which is mounted in a vertically movable sleeve 30 carrying the axle boxes 31, and held in normal position by heavy coil spring 29, preferably arranged inside the sleeve 30. In the bearings 31 is carried the drive wheel shaft 32, preferably in roller bearings 15$^a$, but is free to move only in one direction. That is to say, the shafts 24, 28, and 32, are directly and continually driven by the engine and normally the shaft 32 drives both the wheels 15. The wheels are provided with roller clutches shown in detail in Fig. 5, by means of which the shaft 32 forces the rollers 35$^a$ of the clutch into engagement with the hub 35 on relative forward motion, but allows free relative backward motion. Thus there are four drive wheels arranged in pairs and each one of the four wheels is positively and independently driven in one direction and free to roll on the shaft in the opposite direction.

As shown in Figs. 3 and 4, there is also mounted in vertical boxing 46, a steering sleeve 14 within which the sleeve 30, slides vertically but is locked to revolve therewith by a spline 14$^a$. (Fig. 4). This sleeve carries the worm gear 36 operated by a worm 37 on the shaft 41 driven in any convenient manner by a steering wheel 17 and shaft 17$^a$. (As shown in Fig. 2 the shaft 41 is driven through a set of gears 42, 43, 44 and 45). By this means it will be seen that both pairs of wheels 15 may be revolved about their axial centers without in any wise interfering with the direct driving, so that there is a direct drive by at least one of each pair of wheels in any position of turning the vehicle.

It will be noticed that in turning there is always a direct drive on the tangent of a circle of which the center is the rear end of the vehicle. This is a great advantage over driving by the rear wheels, because in the latter case the effective thrust on the driving wheel is at an angle, approaching as a limit a right angle, to the direction of movement of the front or turning wheels. In other words, while with a rear wheel drive there is no possibility of turning in place, with my construction the vehicle may be turned in place, without diminishing the tractive effect of the driving wheels. In fact, in the case of the back wheels being stuck in the road, the effective load in turning upon them as a pivot is not the whole load but only the portion borne by the front wheels, and the force is applied at the end of a lever constituted by the body of the vehicle and with the rear end acting as the fulcrum. I regard this as a very important feature of my invention. It is not material to my invention what form of clutch be used to connect the driving shaft 32 with the wheels 15, but I have shown in Fig. 5 a very simple and efficient lock or clutch which consists of a set of rollers 35$^a$ mounted in slots in the plate 35, the slots being slightly deeper at one end and the deeper end containing small leaf springs 35$^b$, normally holding the rollers in contact with the shaft 32.

The advantages of the construction above described flow principally from the use of a front wheel drive which is literally universal and is directly applied at all possible positions of the vehicle; also in the provision of directly and continually rotating shafts with clutch engagement with the driving wheel; also in the provision of two independent pairs of drive wheels, or two drives of one wheel each, both pairs of drives being revoluble for the steering; also the provision of a vertically collapsible spring-supported driving gear, whereby the driving is not affected by variations in distance between the vehicle body and the wheel. The complete housing of the parts and the simultaneous operation of the two coöperating pairs of driving wheels in steering is an advantage, as well as the lateral compensation due to increase of tractive power on the pair of wheels having the greater load. It is obvious that by dividing the turning radius of the steering and driving wheels, which is in effect shortening the distance between the weight moved and the fulcrum, the power is greatly multiplied. The steering gear is positively locked in all positions. The worm gear applied to the locally revoluble pairs of wheels enables the removal of the wheels from a ditch, for example, by the steering gear alone, and thus apply the motor power to the best advantage. Moreover, there is not needed any more room for the turning of the wheels 15 than about half the width of the vehicle, instead of the whole width of the vehicle as in constructions heretofore used, thus saving space in the vehicle frame. Again, the advantage of supporting the load at four points rather than three as has heretofore been customary, will be apparent. That is to say instead of a fifth wheel being necessitated, and giving a single point of support for the forward part of the vehicle frame, I provide two supports with a base almost the same width as the entire vehicle. The advantage of the low wide base of the vehicle will also be apparent.

By the ability of the drive wheels to reverse their direction of thrust when turned to 180°, the machine travels backward as a push drive and eliminates all provision heretofore necessary to reverse an auto vehicle. It will also be noted that with the front wheel drive the danger of skidding is reduced because the power is applied as a pull, and not thrust, of the back wheels. Other advantages will readily occur to those familiar with this art.

Having thus described my invention, what I claim is the following:

1. A motor vehicle having two pairs of front drive wheels normally abreast, the wheels of each pair being loosely mounted on their axles but having automatic clutches engaging the same in one direction, a support for said axle of each pair containing driving mechanism for the axle and mounted for complete revolution on a vertical axis between the tread of the wheels, and means to adjust the position of all said wheels about said vertical axes.

2. A motor vehicle providing two pairs of driving wheels at the front of the frame, each pair of wheels being supported on a power driven horizontal axle and supplied with one way clutches engaging said axle, a rotatable vertical column supporting each axle and having means to drive the axle and to rotate the column.

3. In a motor vehicle, driving means comprising several pairs of wheels supported on horizontal axles and said axles mounted for complete revolution on a vertical axes, the drive wheels being provided with means to grip the axle upon relative movement in one direction and to release in the other direction, a motor and gearing to constantly drive said horizontal axle, and gearing to revolve the pair of wheels about said vertical axis.

4. In a motor vehicle, the combination with the frame and the motor, a drive wheel mounted on a horizontal axle, a revoluble vertical column supporting said horizontal axle, and supporting the vehicle frame through a collapsible spring, a relatively movable sleeve splined on said column, and worm gearing to thereby rotate the column without interference with the drive wheels.

5. The combination of a drop frame having a forward extension, a motor on said extension, idle wheels on the rear of the frame and universally movable drive wheels supporting the front of the frame at two points, and gearing to drive said wheels and to revolve them on vertical axes.

6. In a motor vehicle, a mounting for drive wheels comprising a horizontal and a vertical axle, the vertical axle being built up of sleeves and vertically collapsible and means for completely revolving said vertical axle means in the vertical axle for driving the horizontal axle continuously, and wheels on the horizontal axles provided with one-way automatic clutches.

7. A motor vehicle comprising a frame, a pair of idle wheels at the rear end of the frame, two vertically rotatable and collapsible columns at the front end of the frame, a horizontal axle supporting each column and means within said column for driving said axle, and wheels on the axle provided with one-way automatic clutches engaging the same.

8. A motor vehicle having combined driving and steering gear comprising two cylindrical rotatable columns at the front end of the vehicle, said columns being made up of spring supported collapsible elements, a horizontal axle supporting each column, wheels on the ends of said axle provided with one-way automatic clutches, gearing for driving the axle entirely inclosed in said vertical column, and gearing for rotating the columns inclosed in the vehicle frame and the columns, an engine and gearing adapted to rotate said two columns simultaneously and gearing adapted to drive said pairs of wheels independently, substantially as described.

In testimony whereof I have hereunto signed my name in the presence of the two subscribed witnesses.

OTIS A. HOLLIS.

Witnesses:
FREDK. STAUB,
JOS. BAILY BROWN.